United States Patent
Acre et al.

[11] Patent Number: 6,155,335
[45] Date of Patent: Dec. 5, 2000

[54] VEHICLE FAN SHROUD AND COMPONENT COOLING MODULE

[75] Inventors: James A Acre, Barker; Daniel P. McCarthy, Lockport; Richard A. Rose, Williamsville; Richard Paul Ryan, East Amherst, all of N.Y.

[73] Assignee: Delphi Technologies, Inc., Troy, Mich.

[21] Appl. No.: 09/299,504

[22] Filed: Apr. 26, 1999

[51] Int. Cl.⁷ .................................................. F28F 19/00
[52] U.S. Cl. .............................. 165/41; 165/140; 165/67; 165/126; 165/122; 180/68.4; 180/68.1; 123/41.56; 123/41.58
[58] Field of Search .............................. 165/41, 42, 122, 165/124, 123, 125, 126, 67, 140; 180/68.1, 68.4; 123/41.56, 41.57, 41.58, 41.54, 41.51

[56] References Cited

U.S. PATENT DOCUMENTS

| | | | |
|---|---|---|---|
| 2,104,394 | 1/1938 | Halbleib | 165/41 |
| 4,351,162 | 9/1982 | Yee | 62/239 |
| 4,510,991 | 4/1985 | Kawahira | 165/41 |
| 5,526,872 | 6/1996 | Gielda | 165/41 |
| 5,588,482 | 12/1996 | Holka | 165/44 |
| 5,649,587 | 7/1997 | Plant | 165/41 |
| 5,671,802 | 9/1997 | Rogers | 165/41 |
| 5,671,803 | 9/1997 | Tepas et al. | 165/122 X |
| 5,771,961 | 6/1998 | Alizadeh | 165/121 |
| 5,775,450 | 7/1998 | Porter | 180/68.1 |

FOREIGN PATENT DOCUMENTS 104339  4/1942  Sweden ................................ 165/126

*Primary Examiner*—Christopher Atkinson
*Attorney, Agent, or Firm*—Patrick M. Griffin

[57] ABSTRACT

A vehicle fan shroud and component cooling module (24) includes a fan (44) mounted within a fan ring (32) between the radiator (26) and condenser (28). Pressurized air, either positively pressurized (downstream of fan (44)), negatively pressurized (upstream of fan (44)), or both, is routed from within the fan ring (32) and to the component (22) to cool it. Since the air has not yet passed the radiator (26), it is not substantially hotter than regular ambient air. Unlike rammed ambient air, it is pressurized as long as the fan (44) is turning. It therefore provides better cooling than either rammed ambient air, or pressurized air picked up downstream of the radiator (26).

3 Claims, 6 Drawing Sheets

VEHICLE FAN SHROUD AND COMPONENT COOLING MODULE

TECHNICAL FIELD

This invention relates generally to vehicle engine cooling fan shrouds and vehicle underhood component cooling devices.

BACKGROUND OF THE INVENTION

Vehicles with liquid cooled engines generally mount the engine cooling heat exchanger (radiator) at the front of the engine compartment, just behind the bumper and grille, so as to take advantage of the ram air effect at higher vehicle speeds. At lower vehicle speeds, an axially acting engine cooling fan forces air through the radiator. In commercial practice, the fan is generally mounted to a support shroud that both physically secures the fan to the vehicle, and which also surrounds the fan to confine and direct the air efficiently through the radiator. While radiators are typically planar, rectangular structures, the fans are invariably circular, with blades extending radially from a central hub. The inefficiency resulting from this inevitable radiator-fan shape mismatch is reduced by the air ducting action of the shroud, and can be further reduced by using two, side by side fans. The air drawn through the radiator is significantly heated above ambient temperature, typically as much as 80 degrees F above ambient temperature.

Vehicles that also have an air conditioning system generally mount a condenser in front of the radiator. Since condensers operate at significantly lower temperatures than the radiator, it would not be practical to mount them behind the radiator. Therefore, air that is forced through the radiator first flows through the condenser, and is raised in temperature far less, only on the order of 10 degrees F above ambient.

Fan and fan shroud location, in actual commercial practice, is almost invariably behind the radiator, so as to pull air through both the condenser and radiator. The fan and fan shroud materials must obviously be designed to withstand the higher, downstream radiator air temperatures. An obviously cooler location would be upstream, in front of both the condenser and radiator, but this location is invariably rejected due to vulnerability to damage, and, in the case of engine belt driven fans, inaccessibility to the belt. It has also been proposed to place the engine cooling fan in the one remaining possible location, which is the intermediate location between the condenser and radiator, a location that became feasible with the more recent advent of electrically driven cooling fans. This location of the cooling fan is generally touted only as a space saving measure, without any particular recognition of, or use for, the cooler condition of the air found in the intermediate fan location.

As an example of intermediate fan location, U.S. Pat. No. 4,510,991 discloses a fan mounted to the drive shaft of a motor that is mounted to or through the condenser, thereby putting the fan itself between the condenser and radiator. Various novel circular condenser designs better matched to the shape of the fan are disclosed, but there is no particular recognition that the location of the fan is beneficial in terms of cooler air. More recent U.S. Pat. No. 5,771,961 proposes similar designs, also fixing the drive motors to the condenser face, and potentially even placing the fan itself within a very large and ill defined through hole in the condenser. Doing this would remove so much condenser volume and area as to render it essentially unworkable. The disclosure also speaks in terms of eliminating the fan shroud, although air confinement rings surrounding the fan are disclosed, which would be necessary to proper fan air ducting and routing. As a practical matter, any proposal that required a drastic redesign of the standard condenser would not find any significant commercial use.

A more recent trend in new vehicle design is the recognition that many components located within the increasingly crowded and small engine compartments need, or could at least benefit from, forced cooling. Examples include batteries, alternators, and various heat producing electrical components. Two recent co assigned US patents propose forced air, underhood component cooling systems. U.S. Pat. No. 5,671,802 discloses a hose and box system that houses a heat producing component and routes ram air from the front of the vehicle through the box. This utilizes ambient air temperature for cooling, but, of course, can provide no forced cooling air when the vehicle is idling. U.S. Pat. No. 5,775,450 provides essentially the converse in terms of benefit and shortcomings. A scoop behind the fan (which fan is behind the radiator) diverts some of the fan forced air up and over the alternator, cooling it whenever the fan is running, but using air that has been heated by the radiator significantly above ambient temperature. There are components for which each system will work perfectly well, that is, those that do not need a continual stream of air, or which can benefit from cooling even by warmer air. However, there are underhood components that would potentially benefit both from a continual supply of forced cooling air, especially if the air were cooler than the air that has already passed through the radiator.

To summarize, all of the inherent space saving advantages of the intermediate cooling fan location are retained, with no change in the basic heat exchanger design, while an improved, forced air component cooling is achieved with minimal additional structure and cost.

SUMMARY OF THE INVENTION

A combined vehicle fan shroud and component cooling module in accordance with the present invention is characterized by the features specified in claim 1.

The invention provides the inherent space saving advantage of the intermediate fan location, but without altering the basic condenser design, and also provides improved underhood component cooling. In the preferred embodiment disclosed, the condenser and radiator are of conventional size, and planar shape, both mounted in front of the vehicle engine compartment in a spaced and preferably parallel configuration. A circular, axially acting engine cooling fan is mounted between the two heat exchangers, to a shroud that both physically secures the fan to the vehicle and which surrounds at least part of the fan blade periphery so as to confine and duct air through the radiator, after it has been pulled through the condenser. As a consequence, a zone of higher than ambient pressure air is created downstream of the fan. In the preferred embodiment, the fan shroud also serves to confine and conduct air pulled through the condenser, creating an additional zone of lower than ambient pressure air upstream of the fan. In both pressure zones, the air has been warmed only by the condenser, and not the radiator. The cooler air quality conveniently allows the shroud to be manufactured from less thermally resistant, but more malleable materials, such as blow molded plastics, if desired.

The vehicle also contains at least one component, such as a battery or the like, that would benefit from a forced cooling air stream. A cooling air duct opens into the rear, higher pressure air zone, so as to capture a portion of the higher pressure air and direct it out and to the component to actively and continually cool it with forced, relatively low temperature air. The duct can easily be incorporated into the fan shroud embodiment disclosed, since it can be conveniently made of more easily molded materials. In addition, if desired, return air duct can be routed from the cooled component back to the lower pressure air zone, creating a complete forced cooling air loop.

DESCRIPTION OF THE PREFERRED EMBODIMENT

Figure 1:
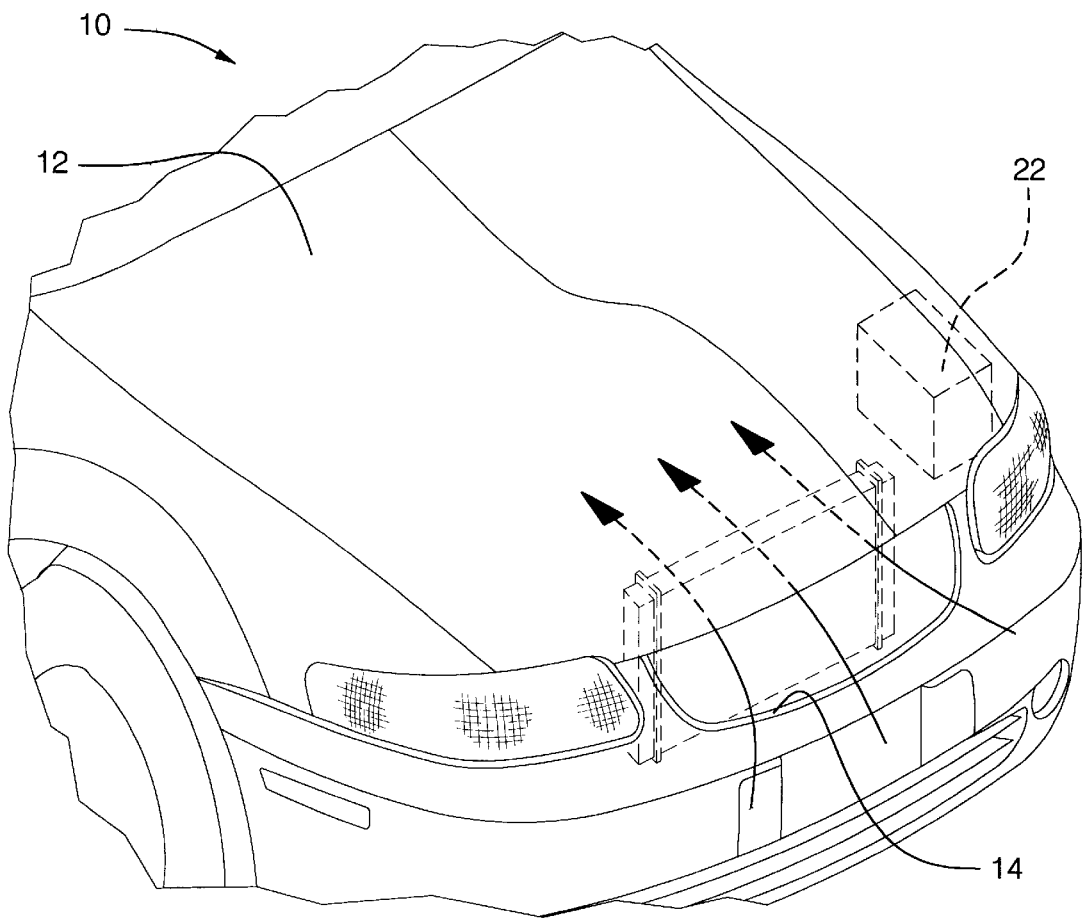
FIG. 1 is a perspective view of a typical vehicle front end and engine compartment.
Figure 2:
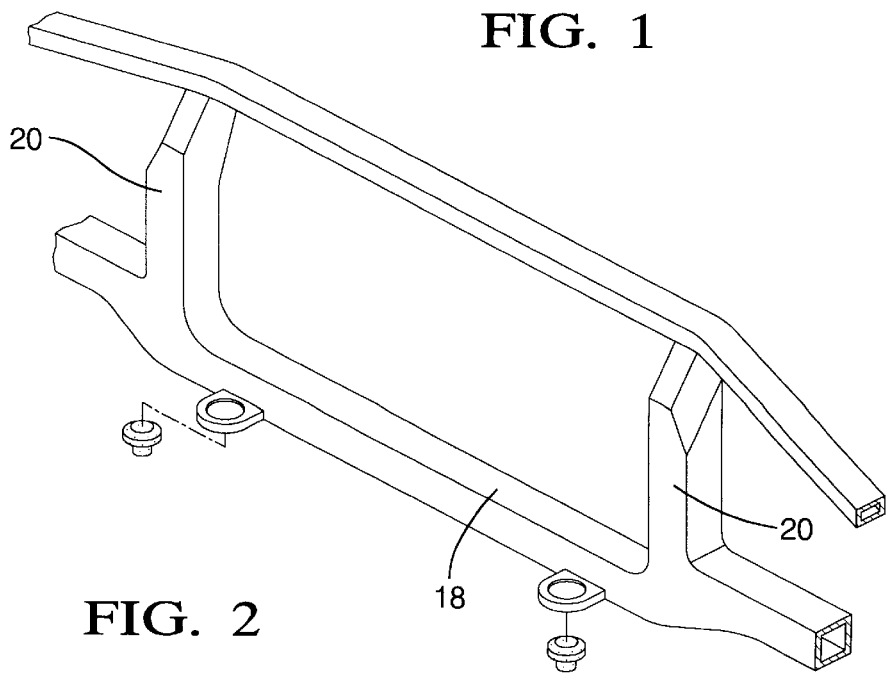
FIG. 2 is a perspective view of a typical vehicle body front end structure.

Referring first to FIGS. 1 and 2, the front end of a conventional vehicle indicated generally at 10 has a covered engine compartment 12 located behind a grill opening 14, through which ambient air flows in the direction indicated by the arrows. The grill opening 14 is backed by a rigid, generally rectangular front end structure, including an upper rail 16, lower rail 18, and connecting side rails 20. These provide the basic structural foundation for the physical mounting of other front end located structures. Within the engine compartment 12, or somewhere relatively near the vehicle front end, is a component, indicated schematically at 22, which is meant to indicate any component, be it a battery, generator, heat producing electrical component, or other that is in need of, or could at least benefit from, active cooling.

Figure 3:
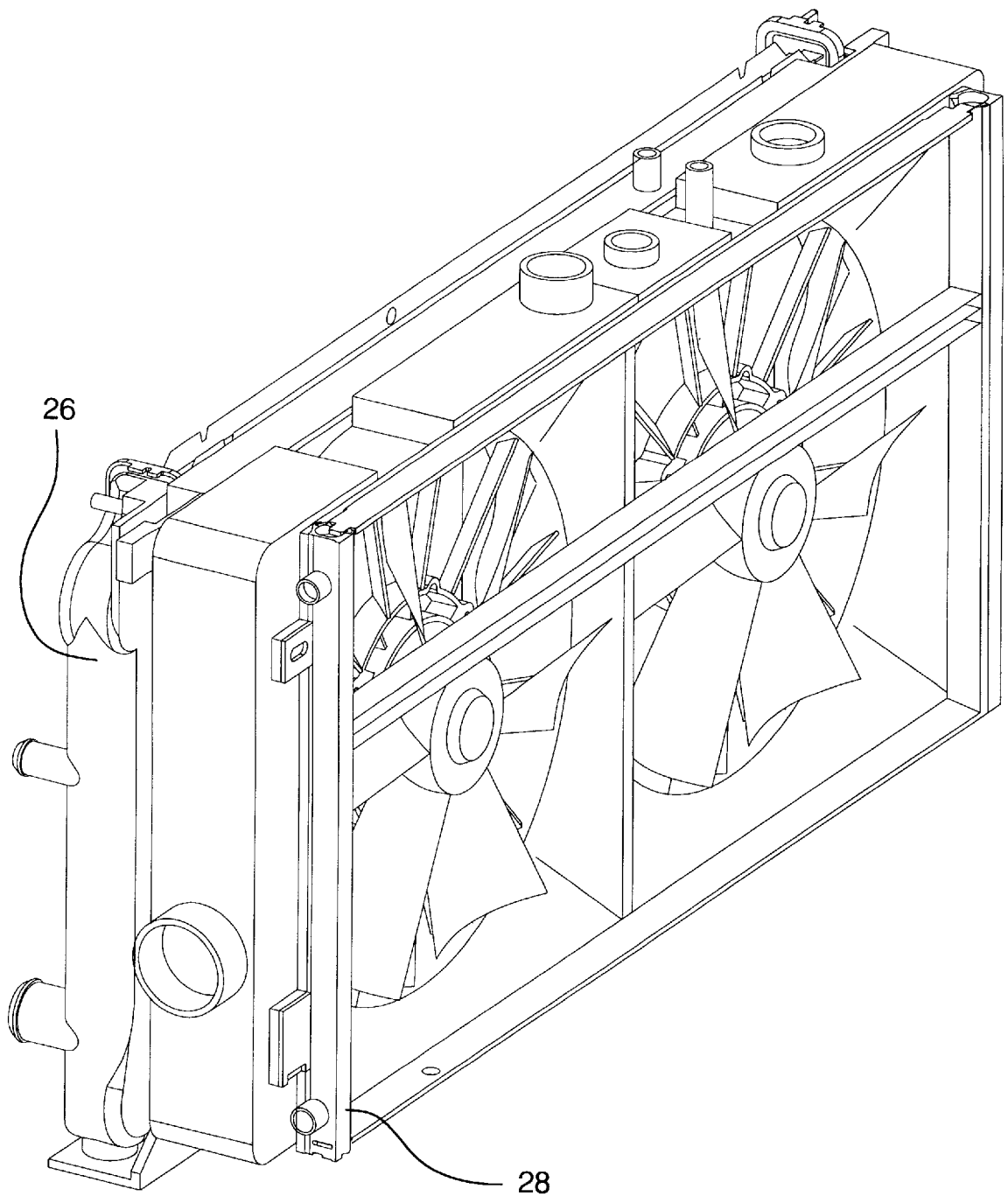
FIG. 3 is a perspective of the assembled module of the invention viewed from the condenser side.
Figure 4:
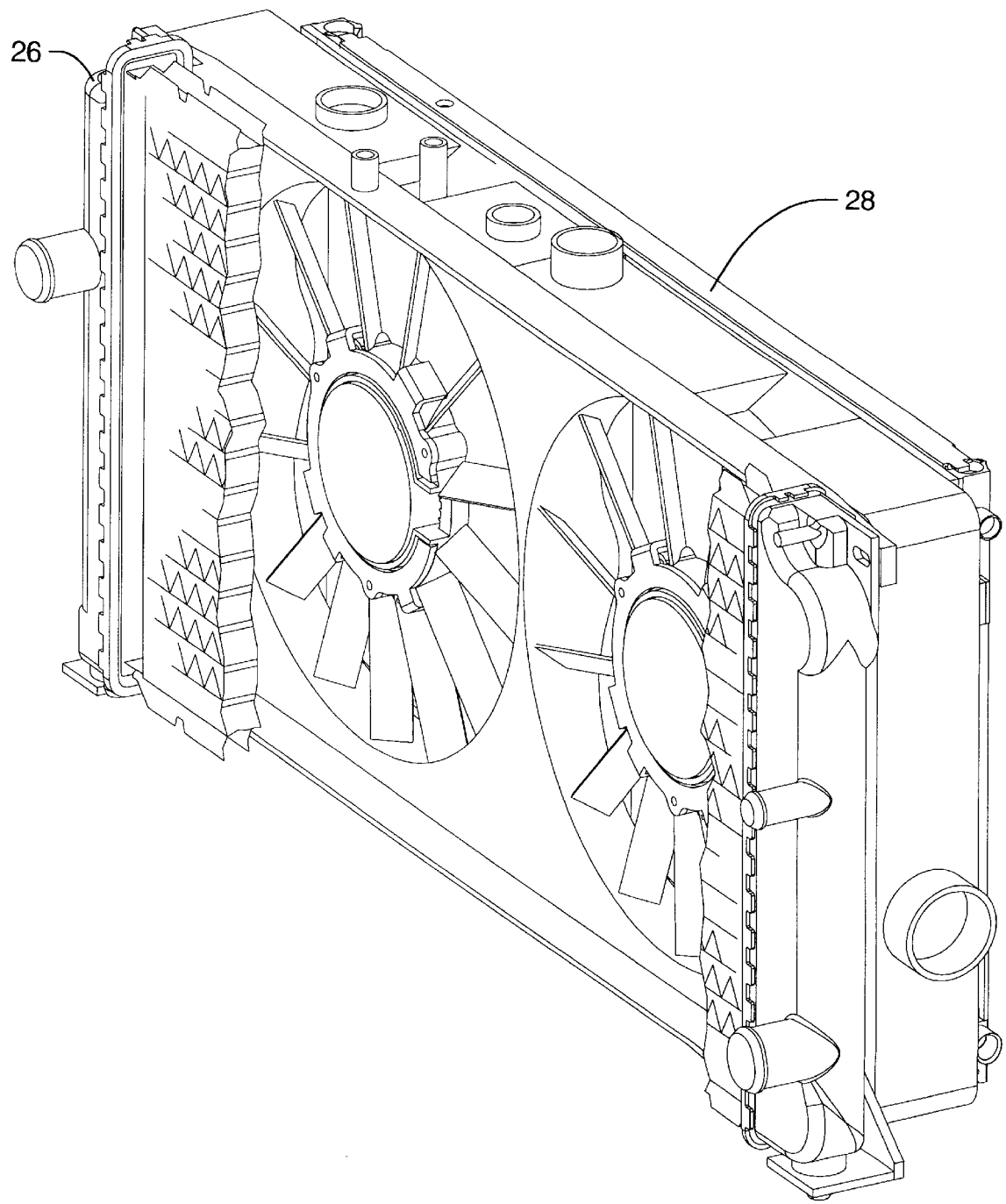
FIG. 4 is a perspective view like FIG. 2, but viewed from the radiator side.

Referring next to FIGS. 3 and 4, a preferred embodiment of a module made according to the invention is indicated generally at 24. A standard radiator 26 and condenser 28, are both basically planar and rectangular structures, with no special feature. As in a typical vehicle, they are mounted to the vehicle front end, just behind the grill opening 14, with the condenser in front. This exposes each to ambient ram air, for maximum cooling. The radiator 26 and condenser 28 are preferably mounted parallel to one another, though exact parallelism is not necessary, and spaced from one another by a typical distance of about a hundred millimeters. In general, everything about the size, location and relative location of the two heat exchangers is conventional, which adds greatly to the commercial potential of the invention.

Figure 6:
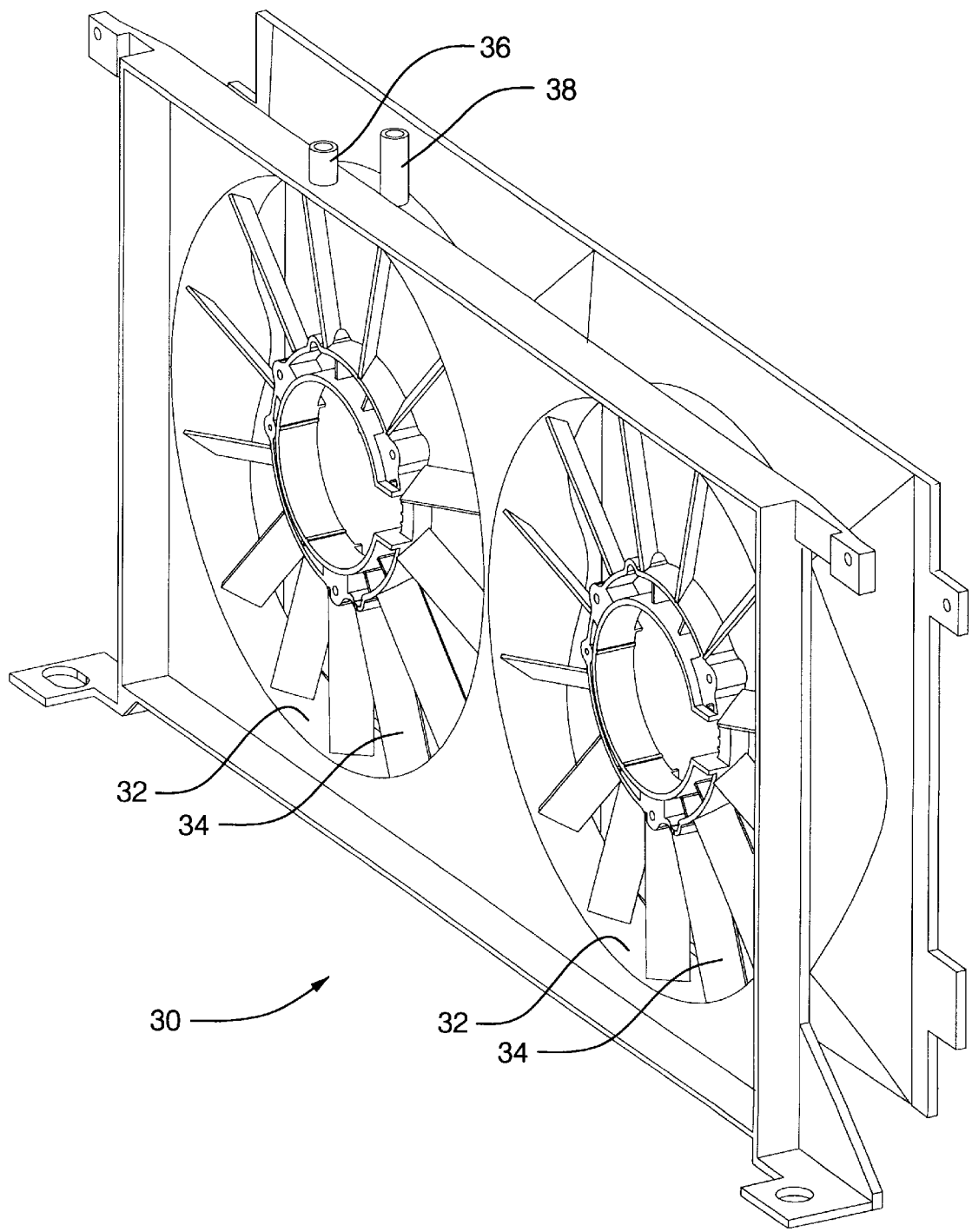
FIG. 6 is a perspective view of the shroud alone.

Referring next to FIGS. 2 and 6, the basic structural component of the module 24 is a shroud, indicated generally at 30. Shroud 30 is preferably rectangular in outline, and rigid enough to be secured to and between the rails 16, 18 and 20, and thereby serve as a secure foundation for other components, including the radiator and condenser 26 and 28. As such, the shroud 30 could be manufactured by several different means, and with different materials. As an example only, it could be compression molded plastic, blow molded plastic, fabricated or stamped metal, or even a metal-plastic hybrid structure. While the material and process can be varied, the basic location of shroud 30, upstream of radiator 28, allows the material used to be one that is less heat resistant, and also allows other heat sensitive components to be mounted to it, in the same general location. As disclosed, shroud 30 is basically a double walled, hollow frame, with at least one, and preferably a pair of side by side, hoop like fan rings 32. Each ring 32 centrally supports a central hub and stator assembly 34. The hub and stator assemblies 34 are rigid enough to support fans and motors, described further below, but, with their spoke like configuration, do not substantially block air flow therethrough. At least one tube 36 on the radiator side of shroud 30 opens through a fan ring 32. As disclosed, another tube 38 can open through a fan ring 32 on the condenser side of shroud 30. These serve a purpose described below. Given the double walled construction, it will be noted that there is a significant amount of empty, open volume surrounding the fan rings 32.

Figure 5:
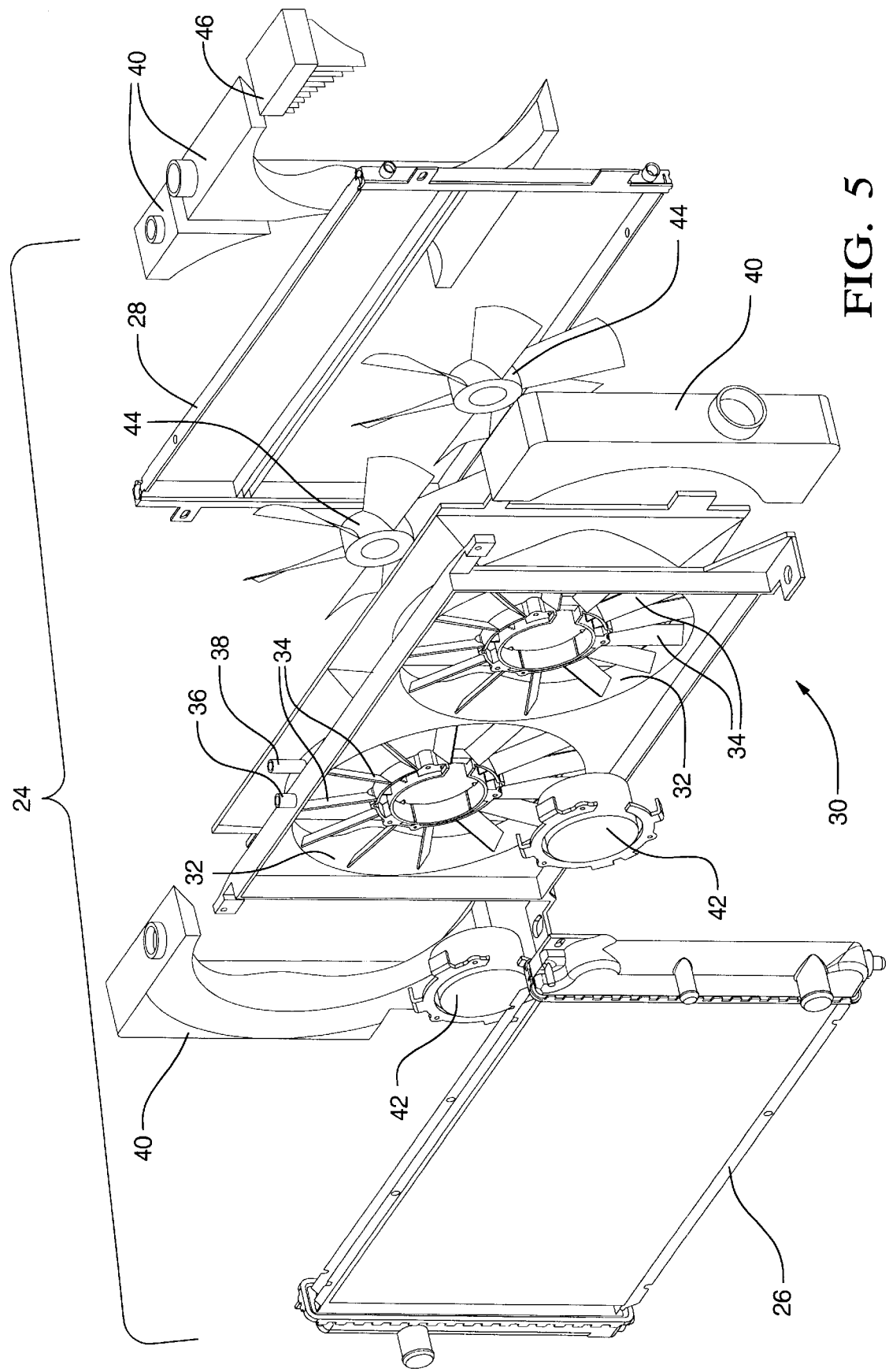
FIG. 5 is an exploded perspective view of FIG. 3.

Referring next to FIG. 5, the relation of shroud 30 to other components mounted thereto is illustrated. As already noted, the condenser 28 and radiator 26 can be mounted to opposite sides of the shroud 30, and are in the embodiment disclosed. Within the residual volumes surrounding the fan rings 32, hollow, shape matched fluid containers 40 can be mounted, to contain any fluid, such as radiator coolant overflow, windshield washer fluid, reserve power steering fluid, etc. This uses space that would otherwise be wasted, with no ill effect on air flow, and with minimal effect on the fluid, given the relatively cool location. Low profile electric fan drive motors 42 are fixed centrally within the hub and stator assemblies 34, and conventional axial air fans 44 are fixed to each of these. As noted, all of these components can be fixed to shroud 30 to create the total module 24 which, in turn, is fixed between the rails 16, 18 and 20, although the containers 40 would be optional. Finally, it is possible to mount a heat sensitive component of some sort, indicated at 46, in a location where it would be open to air that was pressurized within the proximate fan ring 32, as described farther below. As with the containers 40, the component 46 would be an optional, but potentially advantageous, add on to the basic shroud 30.

Figure 7:
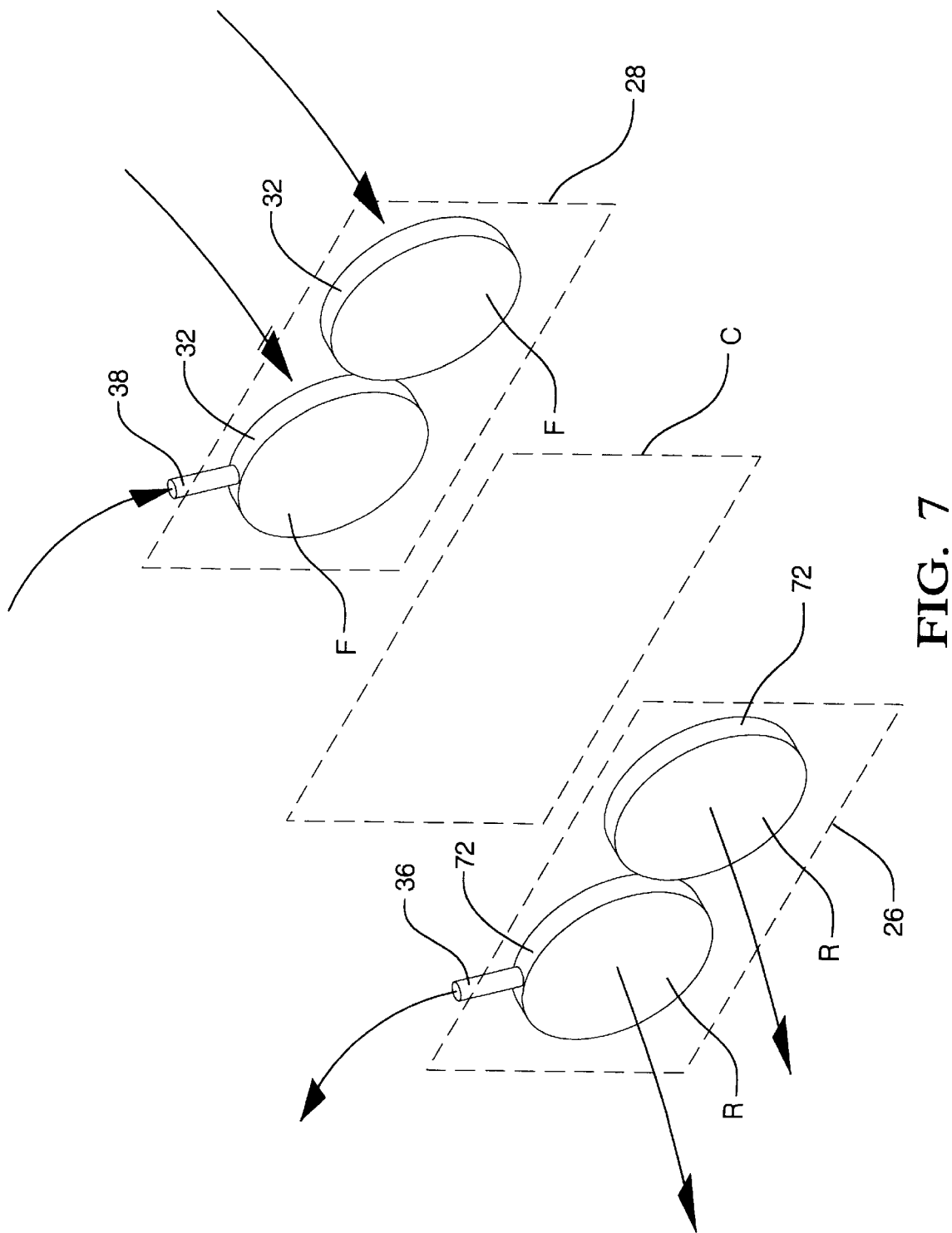
FIG. 7 is a schematic perspective view of the exploded assembly indicating the low and high pressure zones.

Referring next to FIG. 7, the basic operation of module 24 is illustrated in a schematic fashion. The general locations of the condenser 28 and radiator 26 are indicated by dotted planes. The location of the shroud 30 is illustrated by a dotted central plane C, which would bisect the fan rings 32 into upstream and downstream halves. This is done to demarcate distinct pressure zones. As the fans 44 spin, outside air is pulled in through grill opening 14 and initially through condenser 28, where it is heated only about 10 degrees F above ambient temperature. The drawn in air is ducted and guided axially through the fan rings 32. Within a volume bounded axially by the inner face of the condenser 28 and the imaginary plane C, and bounded radially by and within the fan rings 32, the air pressure would be lower than ambient, because of the pulling action of the fans 44. This upstream or front zone is indicated at F. Within a volume bounded axially by the inner face of the radiator 26 and the plane C, and also bounded radially by and within the fan rings 32, the air pressure would be higher than ambient, because of the pushing action of the fans 44. This downstream or rear zone is indicated at R. The tube 36 opens through one fan ring 32 and into the higher pressure rear zone R, while tube 38 opens into the lower pressure front zone F. Tube 36 would provide an escape or outlet for a portion of the pressurized air from zone R, which flow is indicated by the out arrow. The air flowing out of outlet tube 36 could be ducted by a hose or line to the component 22, or to a box containing the component 32, to actively cool it. The cooling air could simply be dumped back to ambient at that point, or, it could instead be routed in a loop back to the inlet tube 38, and into the lower pressure zone F. Either way, pressurized air that had been heated only by the condenser 28, and not yet by the radiator 26, would be provided for active component cooling, at minimal extra cost, and with minimal additional space occupied.

Variations in the embodiment disclosed could be made. Most simply and basically, a component in need of cooling, such as a power transistor or the like, could be mounted to or near the fan shroud 30, with an opening direct through the fan ring(s) 32 to either (or both) the pressure zones R or F. Air would then be pulled through, or pushed through, or forced in a complete loop, directly through the component. Likewise, even with remote mounted components, using hoses or duct work to route the air, it is possible that local ambient air could simply be pulled through or around the component 22 by routing the hose or duct from it and only into the low pressure front zone F. This would work if the pressure were low enough to create enough suction. Therefore, it will be understood that it is not intended to limit the invention to just the embodiment disclosed.

What is claimed is:

1. A combined engine cooling fan and component cooling module (24) for a vehicle (10) having a generally planar engine cooling radiator (26) that operates at a higher temperature mounted at the front end of a vehicle engine compartment (12), and a generally planar air conditioning system condenser (28) that operates at a cooler temperature mounted to the vehicle (10) in front of and spaced from the radiator (26), said vehicle (10) also having at least one component (22) that would benefit from forced air cooling, comprising, an engine cooling fan shroud (30) mounted to the vehicle (10) in the space between the radiator (26) and condenser (28) that supports an engine cooling fan (44) which pulls ambient air through the condenser (28) and pushes it through the radiator (26), thereby creating a front zone (F) of lower than ambient pressure air between the condenser (28) and the fan (44) and a rear zone (R) of higher than ambient pressure air between the fan (44) and the radiator (26), and, a component cooling air supply means that opens into at least one of the pressure zones (R, F), so as to create a forced cooling air flow than can be routed to the component (22) before the cooling air flow has been pushed through the hotter radiator (26).

2. A combined engine cooling fan and component cooling module (24) for a vehicle (10) according to claim 1, further characterized in that the component cooling air supply means includes an air supply outlet (36) secured to the fan shroud (30) that opens into the higher pressure rear zone (R), so as to capture a portion of the higher pressure air after it passes the cooler condenser (28), but before it has been pushed through the hotter radiator (R), and route the captured air to the component (22) for active cooling thereof.

3. A combined engine cooling fan and component cooling module (24) for a vehicle (10) according to claim 2, further characterized in that the component cooling air supply means includes the air supply outlet (36) secured to the fan shroud (30) that opens into the higher pressure rear zone (R), and an air supply inlet (38) secured to the fan shroud (30) that opens into the lower pressure front zone (F), so as to create a complete loop of forced cooling air routed to and from the component (22) for active cooling thereof.

\* \* \* \* \*